United States Patent [19]

Vezzoli et al.

[11] Patent Number: 5,033,827

[45] Date of Patent: Jul. 23, 1991

[54] CODED OPTICAL OSCILLATOR MODULATOR

[75] Inventors: Gary C. Vezzoli, Newton; William C. Cadwallender, Parsippany, both of N.J.

[73] Assignee: The United States of America as represented by the Secretary of the Army, Washington, D.C.

[21] Appl. No.: 554,757

[22] Filed: Jul. 19, 1990

[51] Int. Cl.[5] .................. G02F 1/11; G02F 1/33; H03B 5/12; H01J 40/14

[52] U.S. Cl. .................. 350/358; 331/107 A; 331/187; 250/206

[58] Field of Search .................. 331/187, 107 A; 350/358, 96.13; 250/206

[56] References Cited

FOREIGN PATENT DOCUMENTS 0037051 3/1980 Japan .................. 331/187

Primary Examiner—Eugene R. LaRoche
Assistant Examiner—Michael B. Shingleton
Attorney, Agent, or Firm—Anthony T. Lane; Edward Goldberg; Michael C. Sachs

[57] ABSTRACT

An optical oscillator uses a monochromatic light beam passing through a piezoelectric crystal subjected to acoustic vibrations which cause the emission of a diffracted light beam. The undiffracted beam is detected by photodetecting means and generates a first voltage signal. The diffracted beam is passed through a unit for delaying the passage of the beam, e.g. a fiber optics loop, and detected by photodetecting means to generate a second voltage signal. The signals are combined and fed to a control unit which allows a radio frequency signal to reach the piezoelectric crystal, causing acoustic vibrations. The time delay and voltage output relationships in the loop associated with the diffracted beam cause oscillation and control the frequency of such oscillations. The oscillations can be amplitude and frequency modulated by variation of appropriate circuit parameters.

The oscillator of this invention is useful as an extremely sensitive optical and acoustic sensing and alarm device for intruders into critical areas.

10 Claims, 1 Drawing Sheet

CODED OPTICAL OSCILLATOR MODULATOR

GOVERNMENT INTEREST

The invention described herein may be manufactured and used by or for the U.S. Government for Governmental purposes without the payment of any royalties and is being assigned to the U.S. Government.

FIELD OF THE INVENTION

This invention relates to an optical oscillator/modulator. More specifically, it relates to an oscillator using a monochromatic light source modulated by passage through a piezoelectric crystal which causes emission of a second, diffracted beam in response to variations in refractive index in the crystal due to acoustic vibrations therein.

DESCRIPTION OF PRIOR ART

Previous work has shown the generation of unmodulated optical square wave oscillations by use of a Kerr Cell employing a potassium dihydogen phoshate (KDP) crystal (D. Kaplan, F. A. Hupf, M. W. Derstine, H. M. Gibbs, and R. L. Shoemaker, J. Opt. Eng. 22(1), 161 (January-February 1983).

SUMMARY OF THE INVENTION

This invention relates to an optical oscillator which uses a monochromatic light beam passing through a piezoelectric crystal subjected to acoustic vibrations, which cause the emission of a diffracted light beam. The undiffracted beam is detected by photodetecting means and generates a first voltage signal. The diffracted beam is passed through a unit for delaying the passage of the beam, e. g. a fiber optic loop from a few meters to several hundred meters in length, and detected by photodetecting means to generate a second voltage signal. The signals are combined and fed to a control unit which allows a radio frequency signal to reach the piezoelectric crystal, causing acoustic vibrations. The time delay in the loop associated with the diffracted beam and the opposing output voltages of the optical detectors contribute to the factors causing oscillations and control their frequency. The oscillations can be amplitude and frequency modulated by variation of appropriate circuit parameters.

The oscillator/modulator mode of this invention is useful as an extremely sensitive optical and acoustic sensing and alarm device for intruders into critical areas.

DESCRIPTION OF PREFERRED EMBODIMENT OF THE INVENTION

Figure 1:
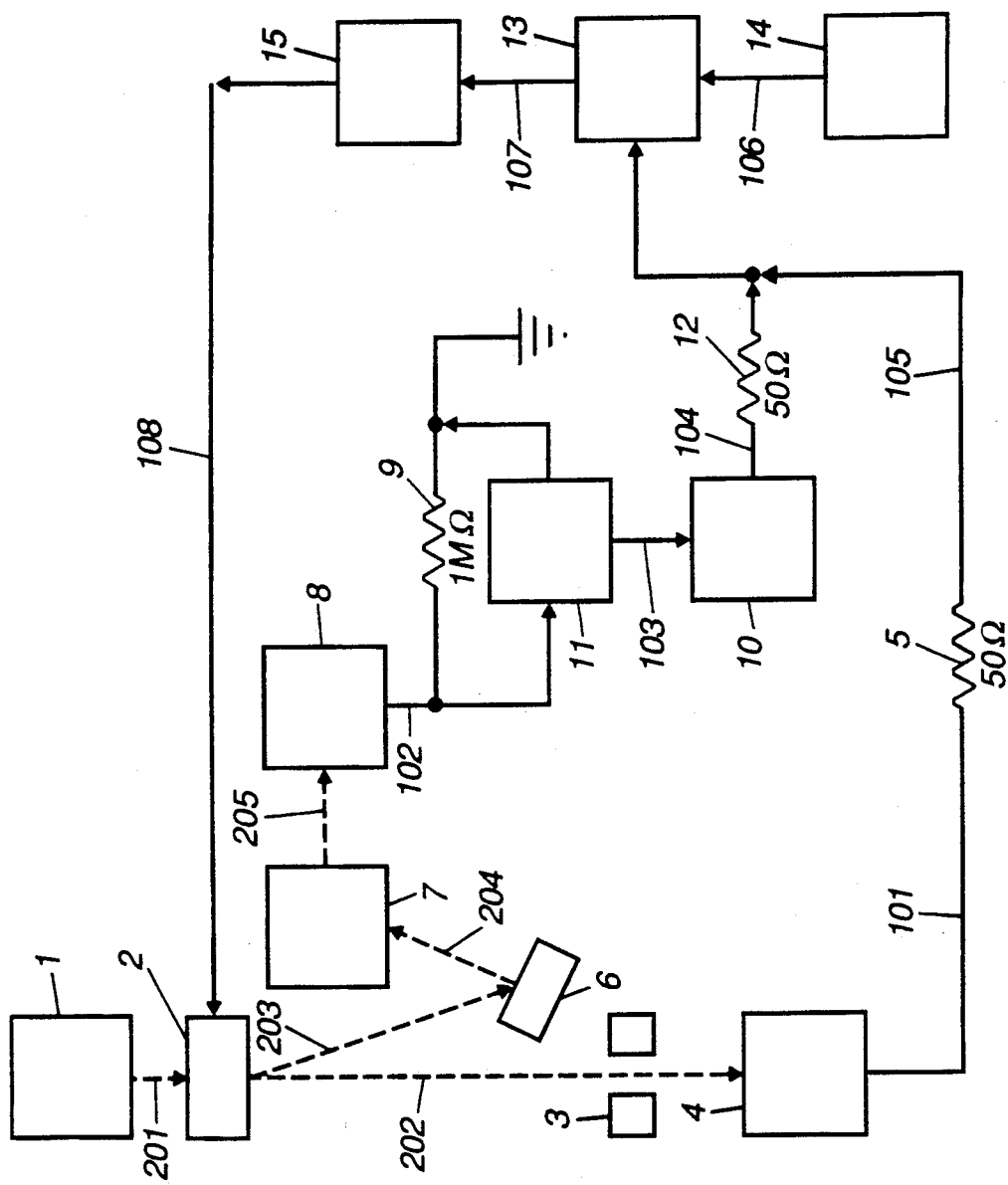
FIG. 1 shows the elements of the preferred embodiment of the invention is schematic form.

With reference to FIG. 1, there is shown a source of monochromatic light source 1, such as a laser. A helium-neon laser (wavelength 6328 Angstrom units), a helium-cadmium laser (wavelength 4416 Angstrom units), or any laser emitting in the visible spectral range from about 4000 to about 7000 Angstrom units in wavelength may be used. The light beam 201 passes through this slab 2, 1-5 mm thick, of a piezoelectric crystal. This crystal may be fused quartz; lithium niobiate, $LiNbO_3$; or any other piezoelectric material having the Perovskite structure, $ABX_3$, e. g. barium titanate or zirconate.

Acoustic vibrations are induced in this crystal 2 by imposition of a radio frequency voltage signal as will be discussed below. These vibrations cause variations in the refractive index of the crystal material, and these in turn cause phase shifts in the light beam 202 issuing from the opposite side of the crystal. In addition, they cause the emission from the crystal of a diffracted beam 203 at a slight angle with the diffracted beam 202.

The undiffracted light beam 202 passes through an aperture in a baffle 3 whose purpose it is to provide a clean beam with minimum fringe perimeter aberration. Typically, a circular aperture 2.5 mm in diameter is used. A converging lense may also be used. The light beam now impinges on a system 4 for converting the light signal into a DC voltage signal. Preferably, the system comprises a photomultiplier which amplifies the effect of the light, which is then measured by a radiometer, whose voltage output is amplified by a DC amplifier having an output 101.

The diffracted light beam 203 is reflected by a mirror 6 and the reflected beam 204 enters a unit 7 for delaying the passage of the light. A fiber optic coil is preferred, its length ranging from a few meters to several hundred meters. Alternatively, a pair of near-parallel mirrors may be used in which the light beam is reflected back and forth many times before it exits from the device. The beam 205 exiting unit 7 now strikes a photodetector 8 which provides a voltage output 102 proportional to the light input via light beam 205.

The signal 102 is fed to one terminal of a high resistance 9, about 1 Megohm, whose other terminal is grounded. The signal 102 also fed to a digital multimeter 10 having an analogue voltage output 103 which is fed to a unit 11 comprising a DC amplifier having a rheostat in its input circuit whose adjustment controls the overall voltage gain from the input signal 103 to the output signal 104.

The voltage outputs 101 and 104, which oppose each other, are each fed to a low resistance, 5 and 12, respectively. These resistors, which are preferably about 50 ohms, are connected to a common terminal 105 at which a combined signal is fed to a control module 13 connected to a radio frequency source 14 comprising a rheostat in its output circuit for voltage control. The control module 13 acts like a relay switch allowing the radio frequency signal to reach the crystal 2 via a power amplifier 15 when the input voltage to the control module is above a critical negative value; whenever this voltage is below this critical value, the radio frequency output to the crystal 2 via the power amplifier 15 is cut off.

The radio frequency employed may range from 10 to 100 MHz; 42 MHz is typically used.

The feedback loop represented by the diffracted beam 203, the reflected beam 204, the delayed beam 205, the photodetector 8 and the components leading to the output voltage signal 104 provides the instability that makes this circuit oscillate. The time required for a signal to travel trough this feedback loop, which is in excess of 400 nanoseconds (the time required for the diffracted beam to turn itself off) determines the frequency of instabilities associated with the oscillations. This is akin to what is referred to as an Ikeda instability and occurs in an electro-optic circuit with feedback whenever the carrier round-trip time in the feedback loop exceeds the total turn-off time of the bistable element, in this instance the acousto-optic device.

Signal sources modifying the gain of the amplifiers utilized in this circuit can be used to provide amplitude modulation of the oscillator output signal. Frequency modulation of the oscillator output can be provided by varying the location of the photodetector 8.

The circuit of this invention, in its "off" (or "on") mode, can be triggered to start (or stop) oscillating by very slight variations in light intensity or very slight mechanical vibrations in the crystal. This is the basis for this invention's usefulness as a very sensitive acoustical and optical sensor against intruders into sensitive areas.

While there has been described what at present is considered to be the preferred embodiment of this invention, it will be obvious to those skilled in the art that various changes and modifications may be made therein without departing from the invention and it is therefore intended to cover all such modifications and changes as fall within the spirit and scope of the invention.

What is claimed is:

1. An oscillator comprising a source of a monochromatic light beam, a piezoelectric crystal through which said light beam passes, means for detecting the intensity of the light beam after passage through said crystal, means for delaying and detecting the intensity of a diffracted second light beam, an electrical circuit for combining the signal outputs from said means for detecting the intensities of the undiffracted and diffracted light beams, a control module having an input connected to the combined signal outputs and further being connected to a source of a radio frequency signal, said control module allowing the radio frequency signal to pass back to the piezoelectric crystal via an amplifier when the combined signal output is more positive than a critical value, and shutting off the radio frequency signal to the piezoelectric crystal when the combined signal output is more negative than said critical value, whereby an oscillation is caused to occur.

2. An oscillator according to claim 1 in which the source of the monochromatic light beam is a laser emitting in the spectral range from 4000 to 7000 Angstrom units.

3. An oscillator according to claim 1 in which the source of the monochromatic light beam is a helium-neon laser.

4. An oscillator according to claim 1 in which the source of the monochromatic light beam is a helium-cadmium laser.

5. An oscillator according to claim 1 in which the piezoelectric crystal is selected from the group consisting of fused quartz, lithium niobiate, barium titanate and barium zirconate.

6. An oscillator according to claim 1 in which the means for detecting the intensity of the undiffracted beam comprises a photomultiplier whose output reaches a radiometer, whose output is amplified by an amplifier; and in which the means for delaying and detecting the intensity of the diffracted beam comprises a mirror reflecting the diffracted beam, means for delaying the passage of the reflected beam, and a photodetector receiving the delayed beam.

7. An oscillator according to claim 6 in which the means for delaying the passage of the reflected beam is a fiber optic loop.

8. An oscillator according to claim 6 in which the means for delaying the passage of the reflected beam is a pair of near-parallel mirrors between which the beam is reflected back and forth many times, the number of reflections and the optical path length depending upon the angle between the mirrors.

9. An oscillator according to claim 1 in which the radio frequency signal is generated by an oscillator operating at between 10 and 100 MHz.

10. A method of generating optical oscillations comprising generation of a monochromatic light beam which activates the apparatus as recited in claim 1.

* * * * *